(12) United States Patent
Higuchi et al.

(10) Patent No.: US 10,232,716 B2
(45) Date of Patent: Mar. 19, 2019

(54) POWER SUPPLY DEVICE

(71) Applicant: Hitachi Automotive Systems, Ltd., Hitachinaka-shi, Ibaraki (JP)

(72) Inventors: Katsuhiro Higuchi, Hitachinaka (JP); Toshio Hiraishi, Hitachinaka (JP); Kenji Kubo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 1077 days.

(21) Appl. No.: 14/353,696

(22) PCT Filed: Oct. 31, 2012

(86) PCT No.: PCT/JP2012/078165
§ 371 (c)(1),
(2) Date: Apr. 23, 2014

(87) PCT Pub. No.: WO2013/065734
PCT Pub. Date: May 10, 2013

(65) Prior Publication Data
US 2015/0291041 A1    Oct. 15, 2015

(30) Foreign Application Priority Data
Oct. 31, 2011  (JP) .................................. 2011-239190

(51) Int. Cl.
*B60L 11/18*     (2006.01)
*H02M 7/00*     (2006.01)
(Continued)

(52) U.S. Cl.
CPC ............... *B60L 11/18* (2013.01); *B60L 3/003* (2013.01); *B60L 11/1868* (2013.01);
(Continued)

(58) Field of Classification Search
CPC ......................... B60L 11/18; H02M 2001/0058
(Continued)

(56) References Cited

U.S. PATENT DOCUMENTS

2004/0135589 A1      7/2004 Matuschek et al.
2008/0236964 A1* 10/2008 Kikuchi ................ B60T 13/741
                                                                       188/162
(Continued)

FOREIGN PATENT DOCUMENTS

JP          5-276674 A      10/1993
JP       2004-92530 A       3/2004
(Continued)

OTHER PUBLICATIONS

US PG-Pub Kawahara et al (US 2011/0313613 A1) has been provided as an english translation for WO2010/109956 A1.*
(Continued)

*Primary Examiner* — Alfonso Perez Borroto
(74) *Attorney, Agent, or Firm* — Crowell & Moring LLP

(57) ABSTRACT

A power supply device that converts inputted direct-current power to direct-current power with a predetermined voltage to supply the power to the outside includes a voltage conversion circuit that converts the voltage of the inputted direct-current power, a voltage measurement circuit that measures a voltage value indicating a voltage potential difference between a ground voltage potential in the power supply device and a ground point provided outside the power supply device and connected to the ground voltage potential via a ground strap cable, a current measurement circuit that measures a current value of a load current flowing when de direct-current power is supplied from the power supply device, and an arithmetic circuit that calculates a resistance value corresponding ground connection of the power supply device, based on the voltage value mea- (Continued)

sured by the voltage measurement circuit and the current value measured by the current measurement circuit.

10 Claims, 15 Drawing Sheets

(51) Int. Cl.
*B60L 3/00* (2019.01)
*H02J 7/14* (2006.01)
*H02M 1/32* (2007.01)
*H02M 3/335* (2006.01)
*H02M 1/00* (2006.01)

(52) U.S. Cl.
CPC ............ *H02J 7/1492* (2013.01); *H02M 1/32* (2013.01); *H02M 3/33584* (2013.01); *H02M 7/003* (2013.01); *B60L 2200/26* (2013.01); *B60L 2210/10* (2013.01); *B60L 2240/547* (2013.01); *B60L 2240/549* (2013.01); *H02M 2001/0058* (2013.01); *Y02T 10/7005* (2013.01); *Y02T 10/7066* (2013.01); *Y02T 10/7216* (2013.01); *Y02T 10/92* (2013.01)

(58) Field of Classification Search
USPC ........................................................ 307/10.1
See application file for complete search history.

(56) References Cited

U.S. PATENT DOCUMENTS

| | | | |
|---|---|---|---|
| 2010/0052419 A1 | 3/2010 | Oosawa et al. | |
| 2011/0121807 A1 | 5/2011 | Hofmann et al. | |
| 2011/0156687 A1* | 6/2011 | Gardner | H02M 3/156 323/284 |
| 2011/0313613 A1* | 12/2011 | Kawahara | H01M 10/441 701/34.4 |

FOREIGN PATENT DOCUMENTS

| | | | | |
|---|---|---|---|---|
| JP | 2006-250782 A | 9/2006 | | |
| JP | 2010-54468 A | 3/2010 | | |
| JP | WO 2010109956 A1 * | 9/2010 | ......... | H01M 10/441 |

OTHER PUBLICATIONS

International Search Report (PCT/ISA/210) with English translation dated Feb. 5, 2013 (Three (3) pages).
Chinese Office Action issued in counterpart Chinese Application No. 201280052594.X dated May 3, 2017 with English-language translation (fourteen (14) pages).

* cited by examiner

FIG. 7

RESISTANCE VALUES OF CONNECTIONS

| GRAPH | Rg | Rc1 | Rs | Rc2 |
|---|---|---|---|---|
| ABNORMAL TIME | ∞ | 4.5 mΩ | 0.2 mΩ | 6.3 mΩ |
| NORMAL TIME | 0.7 mΩ | | | |

POWER SUPPLY DEVICE

TECHNICAL FIELD

The present invention relates to power supply devices mounted on vehicles or the like.

BACKGROUND ART

Vehicles such as electric vehicles and hybrid vehicles driven by electric motors are equipped with high voltage batteries. Direct-current power outputted from the high voltage battery is not only supplied to the electric motor but also converted in voltage by a power supply device (DC-DC converter) and then supplied to loads such as various electrical components and a low voltage battery of the vehicle. The power supply device is generally housed in a case formed using material having conductivity such as metal. By fixing this case to the chassis (frame) of the vehicle with metal screws or the like, the power supply device is grounded via the case and the chassis to a vehicle ground shared among other on-vehicle electrical equipment. Further, a ground strap cable for passing load current therethrough during power supply to the loads is connected between the power supply device and the chassis.

When the fixing of the case to the chassis is inadequate, or the connection of the ground strap cable is inadequate in the above-described power supply device, grounding may become defective. In that case, an unexpected large current may flow through an electric wire that connects the power supply device and the high voltage battery during power supply to the loads, causing a problem such as heat generation or damage. Thus, in order to safely supply stable power while preventing such a problem, it is required to monitor the ground connection of the power supply device.

With respect to monitoring the ground connection of electric equipment mounted on a vehicle, PTL 1, for example, discloses a technology in a charging device for charging a storage battery by converting alternating-current power from a power source to direct-current power, in which a voltage potential difference between an electric wire for charge output connected to the storage battery and an electric wire for connection to a vehicle body is detected, based on which a leakage resistance measure between the storage battery and the vehicle body is checked. PTL 2 discloses a technology in which the connection between a signal ground wire connected to the outside of a device and a power ground inside the device is cut off by a switch during operation of the DC-DC converter, and by measuring a voltage potential difference of the power ground relative to the signal ground at that time, the state of connection between the power ground and the device case is checked to monitor the ground connection.

CITATION LIST

Patent Literature

PTL 1: JP 05-276674 A
PTL 2: US 2011/0121807 A

SUMMARY OF INVENTION

Technical Problem

The technology disclosed in PTL 1 is for checking a leakage resistance measure between the storage battery and the vehicle body, and thus it cannot be monitored whether the power supply device is reliably grounded. On the other hand, in the technology disclosed in PTL 2, when a current flowing through the signal ground wire is small, for example, the voltage potential difference of the power ground relative to the signal ground wire sometimes cannot be measured accurately, and the ground connection cannot be monitored correctly.

Solution to Problem

A power supply device according to an aspect of the present invention converts inputted direct-current power to direct-current power with a predetermined voltage to supply the power to the outside, and includes: a voltage conversion circuit that converts the voltage of the inputted direct-current power; a voltage measurement circuit that measures a voltage value indicating a voltage potential difference between a ground voltage potential in the power supply device and a ground point provided outside the power supply device and connected to the ground voltage potential via a ground strap cable; a current measurement circuit that measures a current value of a load current flowing when the direct-current power is supplied from the power supply device; and an arithmetic circuit that calculates a resistance value corresponding to ground connection of the power supply device, based on the voltage value measured by the voltage measurement circuit and the current value measured by the current measurement circuit.

Advantageous Effects of Invention

According to the present invention, the ground connection of a power supply device mounted on a vehicle or the like can he accurately monitored.

BRIEF DESCRIPTION OF DRAWINGS

FIG. 7 is a table illustrating an example of setting of resistance values of the connection resistances.

DESCRIPTION OF EMBODIMENT

Figure 1:
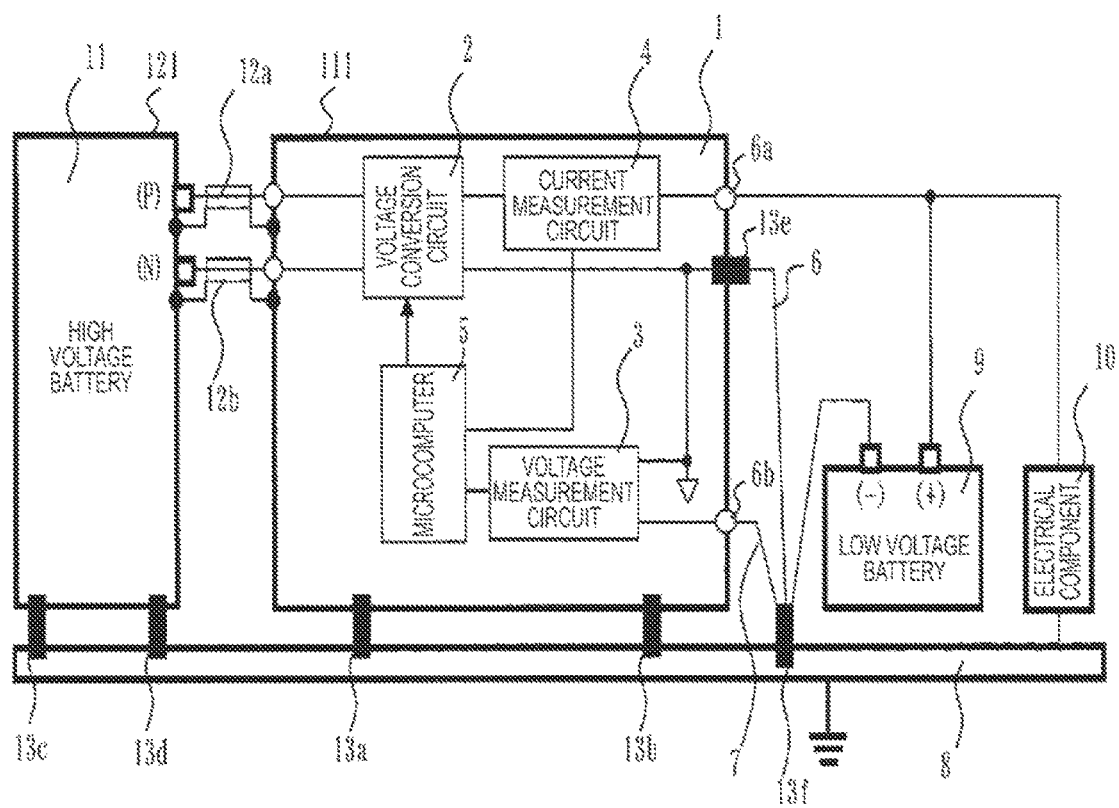
FIG. 1 is a block diagram illustrating the configuration of a power supply system including a power supply device according to an embodiment of the present invention.

Hereinafter a power supply device according to an embodiment of the present invention will be described with reference to the drawings. FIG. 1 is a block diagram illustrating the configuration of a power supply device system including a power supply device 1 according to the embodiment of the present invention. The power supply device system is mounted for use on a vehicle driven by an electric motor, such as an electric vehicle or a hybrid vehicle.

The power supply system shown in FIG. 1 includes the power supply device 1, a low voltage battery (auxiliary battery) 9, an electrical component 10, and a high voltage battery 11. The power supply device 1 and the high voltage battery 11 are covered in metal cases 111 and 121 having conductivity, respectively, and are connected to each other via shielded wires 12a and 12b. The case 111 of the power supply device 1 is fixed to a chassis 8 of the vehicle with metal bolts 13a and 13b. The case 121 of the high voltage battery 11 is likewise fixed to the chassis 8 with metal bolts 13c and 13d. Thus, the power supply device 1 and the high voltage battery 11 are electrically connected to the chassis 8, and are grounded to a common vehicle ground.

The power supply device 1 is provided with a voltage conversion circuit 2, a voltage measurement circuit 3, a current measurement circuit 4, and a microcomputer 5. These are housed in the case 111, and are grounded with the voltage potential of the case 111 as a common ground (GND) voltage potential. A metal bolt 13e connected to one end of a ground strap cable 6 is attached to the case 111. The other end of the ground strap cable 6 is connected to a metal bolt 13f attached to the chassis 8. Thus by this electrical connection between the case 111 and the chassis 8 via the ground strap cable 6, in addition to grounding with the above-described bolts 13a and 13b, grounding of the power supply device 1 is further done with a portion of the chassis 8 to which the bolt 13f is attached as a ground point.

The voltage conversion circuit 2 converts high-voltage direct-current power inputted from the high voltage battery 11 via the shielded wires 12a and 12b into low-voltage direct-current power, and outputs the direct-current power after the voltage conversion to the low voltage battery 9 and the electrical component 10. The (+) side output of the voltage conversion circuit 2 is connected to the (+) terminals of the low voltage battery 9 and the electrical component 10 via the current measurement circuit 4 and a plug 6a provided at the case 111. On the other hand, the (−) side output of the voltage conversion circuit 2 is connected to the (−) terminal of the low voltage battery 9 via the bolt 13e, the ground strap cable 6, and the bolt 13f. The (−) side output of the voltage conversion circuit 2 is also connected to the (−) terminal of the electrical component 10 via the bolt 13e, the ground strap cable 6, the bolt 13f, and the chassis 8. Thus, via the power supply device 1, direct-current power is supplied from the high voltage battery 11 to the low voltage battery 9 and the electrical component 10.

When direct-current power supplied to the low voltage battery 9 and the electrical component 10, the ground strap cable 6 acts as a return path for current consumed in them. Therefore, it is preferable to use, for the ground strap cable 6, one having current withstanding capability appropriate to the maximum amount of current consumed in the low voltage battery 9 and the electrical component 10.

The voltage measurement circuit 3 is connected at one end to the bolt 13f attached to the chassis 8 via the plug 6b provided at the case 111 and a detecting cable 7, and is connected at the other end to the bolt 13e attached to the case 111. A voltage value indicating the voltage potential difference between the two connection points is measured to measure the voltage potential difference between the voltage potential of the case 111, that is, the GND voltage potential inside the power supply device 1 and the chassis 8.

The current measurement circuit 4 measures the current value of a direct current (load current) outputted from the voltage conversion circuit 2 when direct-current power is supplied to the low voltage battery 9 and the electrical component 10.

The microcomputer 5 takes in the voltage value measured by the voltage measurement circuit 3, and the current value measured by the current measurement circuit 4, and based on them, calculates the resistance value corresponding to the ground connection of the power supply device 1. More specifically, by dividing the voltage value measured by the voltage measurement circuit 3 by the current value measured by the current measurement circuit 4, the microcomputer 5 calculates the resistance value of the connection between the chassis 8 and the case 111. Then, based on the calculated resistance value, the microcomputer 5 determines whether the ground connection of the power supply device 1 is normal or not, and performs operation control over the voltage conversion circuit 2 as needed.

Figure 2:
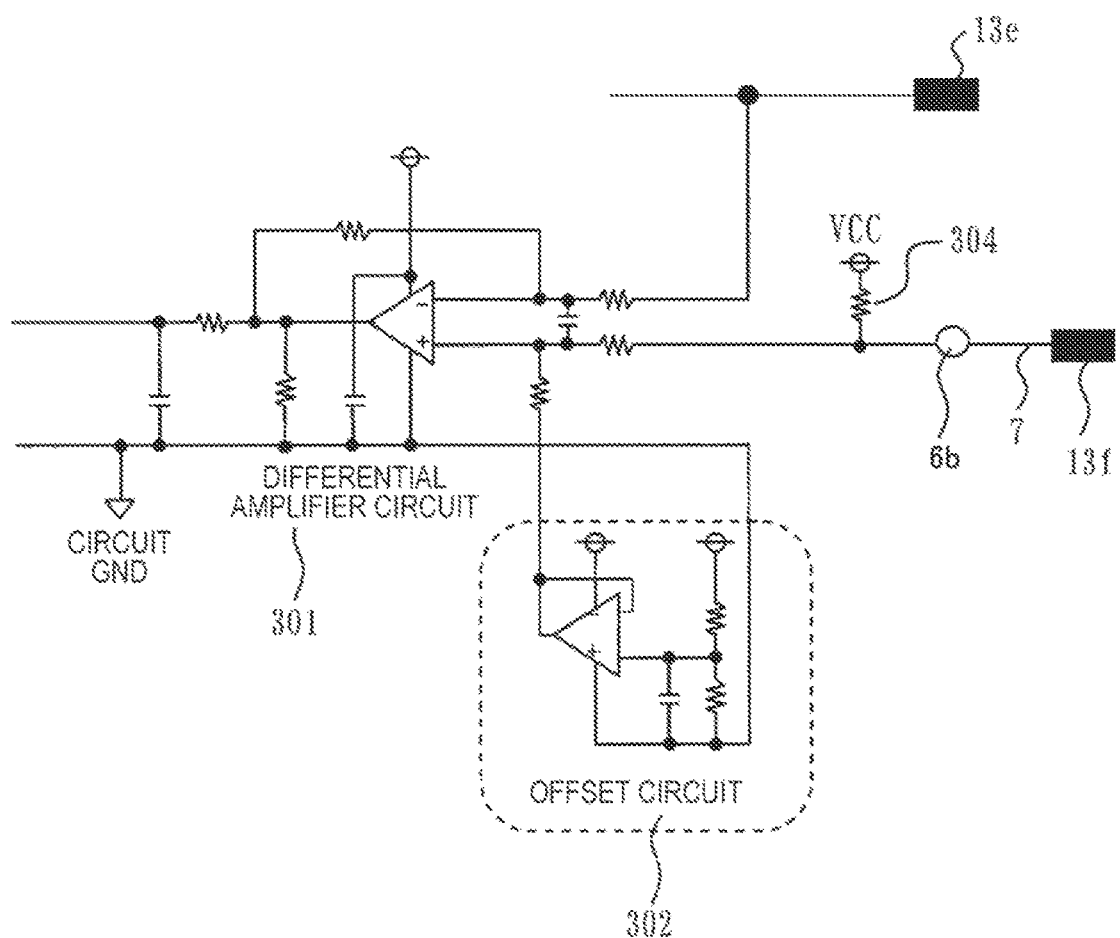
FIG. 2 is a diagram illustrating an example of a voltage measurement circuit.

FIG. 2 is a diagram illustrating an example of the voltage measurement circuit 3. The voltage potential of the bolt 13f (the voltage potential of the chassis 8) via the plug 6b and the detecting cable 7, and the voltage potential of the bolt 13e (the voltage potential of the case 111), that is, the GND voltage potential of the power supply device 1, are individually inputted to a differential amplifier circuit 301 in the voltage measurement circuit 3. The differential amplifier circuit 301 amplifies the voltage potential difference between them, and outputs it to the microcomputer 5. At this time, the positive and negative of the voltage potential difference is reversed in response to changes in the direction of current flowing through the ground strap cable 6. For this, on the input side of the differential amplifier circuit 301, an offset circuit 302 for allowing measurement of the voltage potential difference regardless of the current direction is provided.

Of two input lines to the differential amplifier circuit 301 that the voltage measurement circuit 3 includes, an input line on the side connected to the ground point of the chassis 8 via the bolt 13f is connected to a power source VCC of The voltage measurement circuit 3 via a resistance 304. This allows a current to flow through the plug 6b when the plug 6b and the detecting cable 7 are connected, preventing a terminal contact surface of the plug 6b from being covered by an oxide coating or the like. Specifically, when a conduction failure due to a coating that prevents electrical connection of the terminal contact surface such as an oxide coating occurs in the plug 6b, the voltage potential difference between the chassis 8 and the GND voltage potential of the power supply device 1 cannot be accurately measured by the voltage measurement circuit 3. Therefore, this is prevented to allow accurate measurement of the voltage potential difference.

Next, determination on the ground connection in the power supply device 1 will be described in detail below.

Under normal conditions, the case 111 of the power supply device 1 and the case 121 of the high voltage battery 11 are fixed to the chassis 8 with the bolts 13a to 13d with no looseness. The ground strap cable 6 is connected between the case 111 and the chassis 8 with the bolts 13e and 13f with no looseness. A current outputted from the voltage conversion circuit 2 in this state passes through the current measurement circuit 4, and through the low voltage battery 9 and the electrical component 10, and then returns to the voltage conversion circuit 2 via the ground strap cable 6, or the chassis 8 and the case 111. At this time, the resistance value of the ground strap cable 6 is approximately 0 Ω, hardly causing a voltage drop in the ground strap cable 6. Therefore, the voltage potential of the chassis 8 and the GND voltage potential of the power supply device 1 are approximately the same voltage potential, and the voltage potential difference measured at the voltage measurement circuit 3 is approximately 0 V. Consequently, the resistance value calculated by the microcomputer 5 is a value close to 0 Ω.

Figure 3:
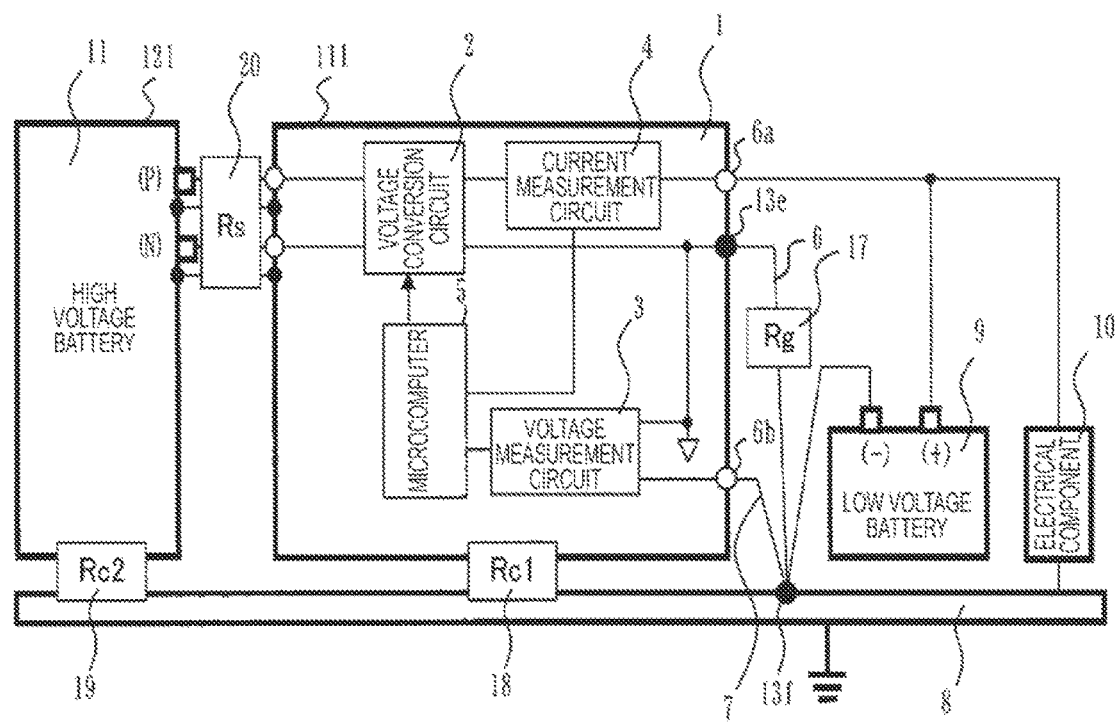
FIG. 3 is a block diagram illustrating connection resistances at a normal time.
Figure 4:
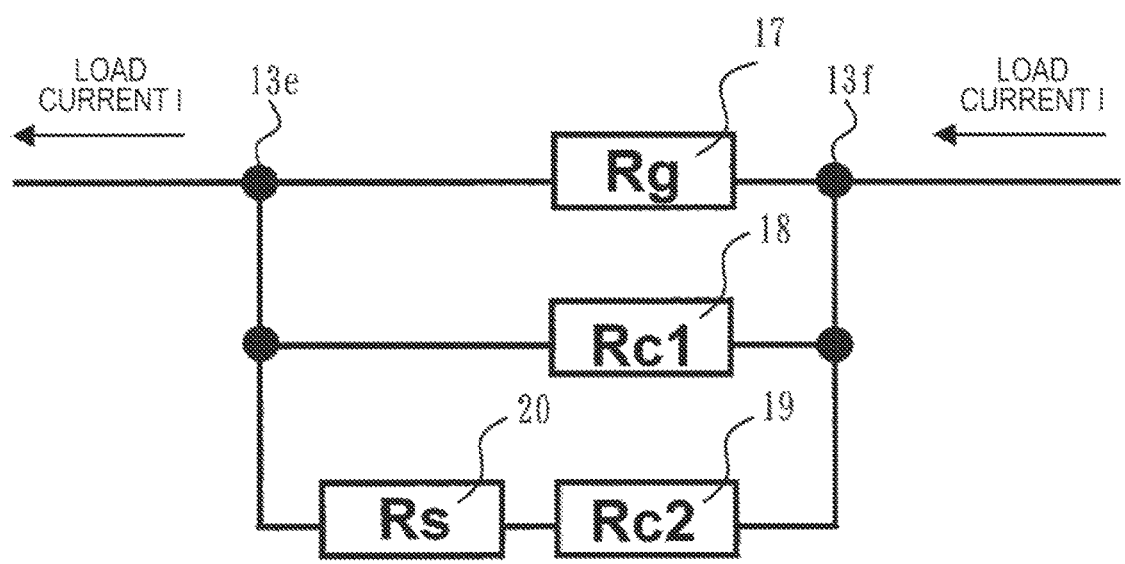
FIG. 4 is a diagram illustrating an equivalent circuit from which to determine a combined resistance value of the connection resistances at a normal time.

The method of calculating the above-described resistance value indicating the ground connection at a normal time will be described further in detail. FIG. 3 is a block diagram illustrating connection resistances caused by the ground strap cable 6, the bolts 13a to 13d, and the shielded wires 12a and 12b at a normal time. FIG. 4 is a diagram illustrating an equivalent circuit from which to determine a combined resistance value of the connection resistances shown in FIG. 3.

As shown by reference signs 17 and 18 in FIG. 3, respectively, the connection resistance value of the ground strap cable 6 between the case 111 of the power supply device 1 and the chassis 8 is denoted as Rg, and the connection resistance value of the bolts 13a and 13b is denoted as Rc1. Also as shown by reference sign 19, the connection resistance value Rc2 of the bolts 13c and 13d between the case 121 of the high voltage battery 11 and the chassis 8 is denoted as Rc2. As shown by reference sign 20, the connection resistance value of the shielded wires 12a and 12b between the case 121 of the high voltage battery 11 and the case 111 of the power supply device 1 is denoted as Rs. With the combined resistance value into which these resistance values are combined denoted as Rtotal, from the equivalent circuit shown in FIG. 4, Rtotal is expressed by the following formula (1).

$$R\text{total}=1/\{1/Rg+1/Rc1+1/(Rc2+Rs)\} \quad (1)$$

Here, when the ground strap cable 6 has current withstanding capability appropriate to the maximum amount of current consumed in the low voltage battery 9 and the electrical component 10, the connection resistance value Rg is approximately 0 Ω, so that the combined resistance value Rtotal expressed as formula (1) is also a value close to 0 Ω. Thus, the microcomputer 5 calculates a resistance value close to 0 Ω.

Next, an example at the time of occurrence of an abnormality will be described. The bolts 13a and 13b fixing the case 111 of the power supply device 1 to the chassis 8 can be significantly increased in the connection resistance value as compared with that at a normal time due to looseness or the like. The ground strap cable 6 can also be significantly increased in the connection resistance value as compared with that at a normal time due to unconnectedness, disconnection, deterioration, or the like. When the connection resistance value at the time of occurrence of these abnormalities is sufficiently greater than the connection resistance value of the bolts 13c and 13d fixing the case 121 of the high voltage battery 11 to the chassis 8 and the connection resistance value of the shielded wires 12a and 12b, the return path of current consumed in the low voltage battery 9 and the electrical component 10 is not via the ground strap cable 6 but via the bolts 13c and 13d and the shielded wires 12a and 12b.

The shielded wires 12a and 12b are not intended to pass a large current, and thus usually have a resistance value greater than that of the ground strap cable 6. Therefore, a voltage drop in proportion to a consumed current occurs in the shielded wires 12a and 12b, and the voltage potential difference due to the voltage drop is measured by the voltage measurement circuit 3. As a result, the resistance value calculated by the microcomputer 5 is not a value close to 0 Ω like at a normal time. Thus, it can be inferred that some abnormality occurs at the ground connection of the power supply device 1.

Figure 5:
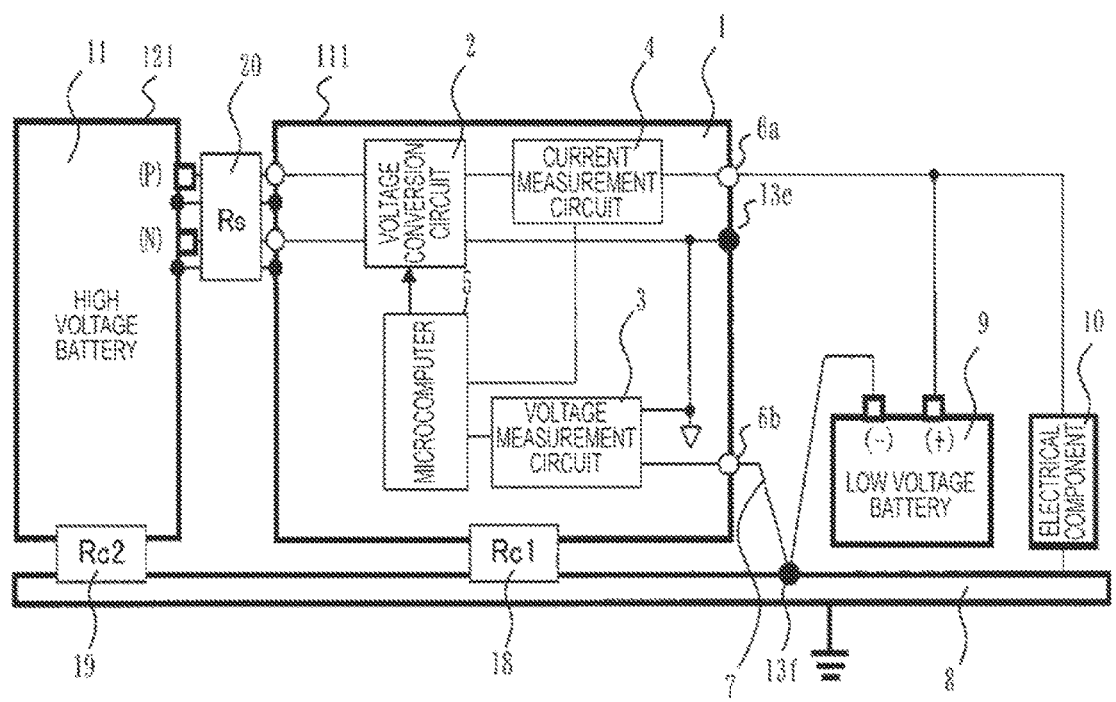
FIG. 5 is a block diagram illustrating connection resistances when an abnormality occurs.
Figure 6:
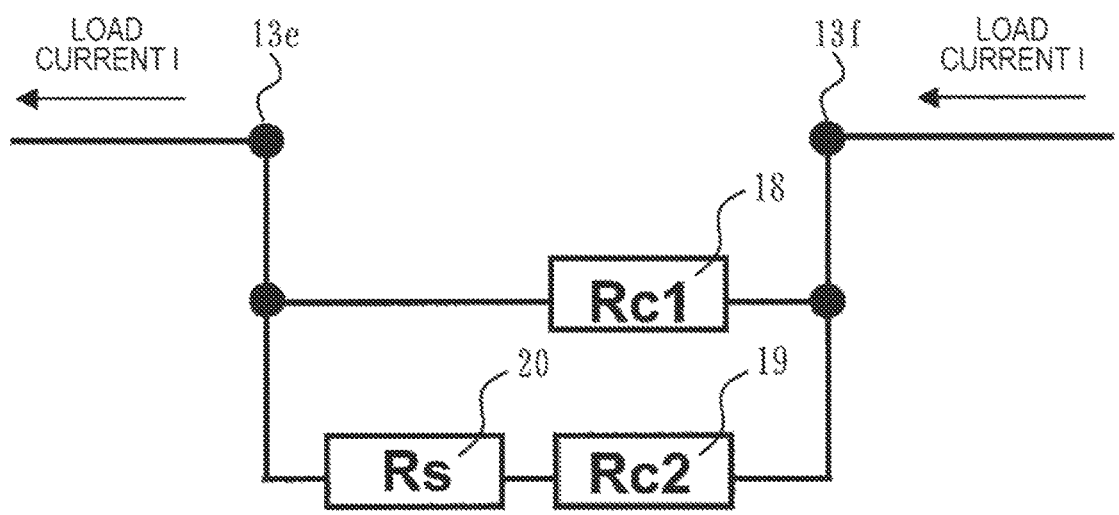
FIG. 6 is a diagram illustrating an equivalent circuit from which to determine a combined resistance value of the connection resistances when an abnormality occurs.

The method of calculating the above-described resistance value indicating the ground connection at the time of occurrence of an abnormality will be further described in detail. FIG. 5 is a block diagram illustrating connection resistances caused by the bolts 13a to 13d and the shielded wires 12a and 12b at the time of occurrence of an abnormality. FIG. 6 is a diagram illustrating an equivalent circuit from which to determine a combined resistance value of the connection resistances shown in FIG. 5. FIGS. 5 and 6 show an example in which the ground strap cable 6 does not function due to unconnectedness, disconnection, or the like, and thus is not present in the circuit configuration.

The combined resistance value Rtotal at the time of occurrence of an abnormality shown in FIGS. 5 and 6 can be expressed, with 1/Rg=0 in the above-described formula (1), as the following formula (2).

$$R\text{total}=1/\{1/Rc1+1/(Rc2+Rs)\} \quad (2)$$

Here, the connection resistance value Rs of the shielded wires 12a and 12b is not a value close to 0 Ω as described above, and has some resistance value. Therefore, when the connection resistance value Rd of the bolts 13a and 13b is increased due to loosening or the like, the combined resistance value Rtotal expressed as formula (2) is not a value close to 0 Ω like that at a normal time. Thus, the resistance value calculated by the microcomputer 5 is also not 0 Ω but some resistance value.

Next, the result of actual measurement of the voltage potential difference between the GND voltage potential and the chassis 8 performed using a prototype, and the resistance value indicating the ground connection of the power supply device 1 determined from the actual measurement result will be described. FIG. 7 is a table illustrating an example of setting of the resistance values of connection resistances in the prototype. As shown in the setting example in FIG. 7, the connection resistance value Rg of the ground strap cable 6 is set at infinity, that is, 1/Rg =0 at the time of occurrence of an abnormality due to unconnectedness, disconnection, or the like, and is at 0.7 mΩ at a normal time. The other connection resistance values Rc1, Rs, and Rc2 are set at 4.5 mΩ, 0.2 mΩ, and 6.3 mΩ, respectively, both at the time of occurrence of an abnormality and at a normal time.

Figure 8:
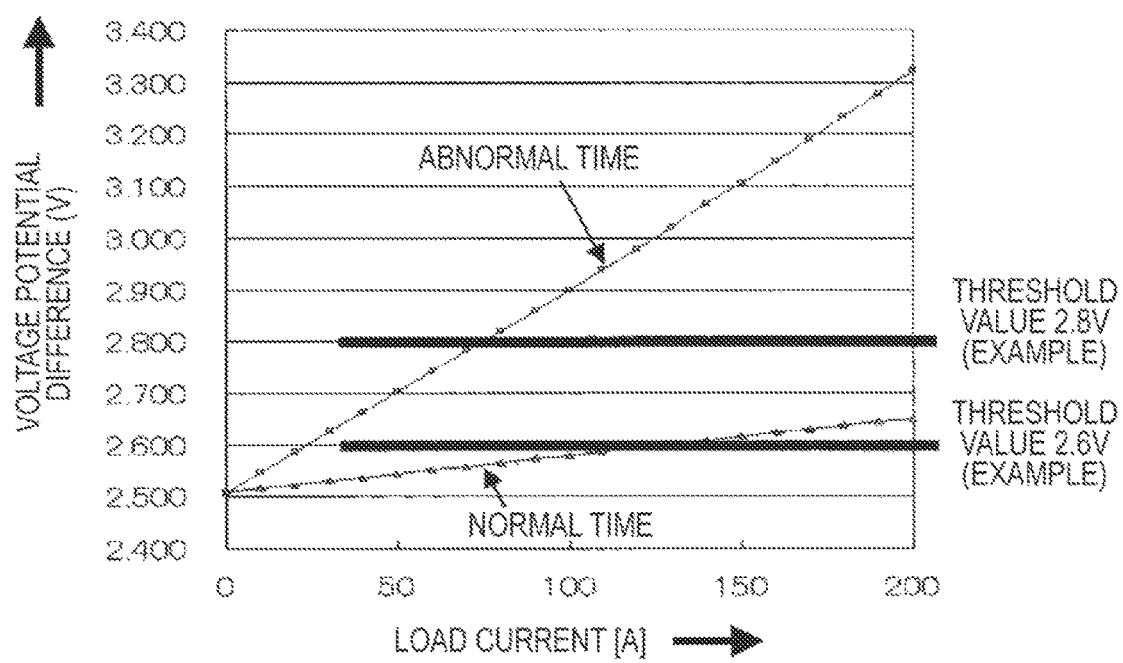
FIG. 8 is a graph illustrating an example of characteristics between voltage potential difference and load current.

FIG. 8 is a graph illustrating an example of characteristics between voltage potential difference between the GND voltage potential and the chassis 8 and load current actually measured using the prototype with the setting values of the connection resistances shown in FIG. 7. In FIG. 8, a graph shown on the upper side in the figure shows characteristics at the time of occurrence of an abnormality, and a graph shown on the lower side shows characteristics at a normal time. In these graphs, the value on the vertical axis indicates the magnitude of the voltage potential difference (V) measured by the voltage measurement circuit 3, and the value on the horizontal axis indicates the magnitude of the load current (A) measured by the current measurement circuit. 4.

Figure 9:
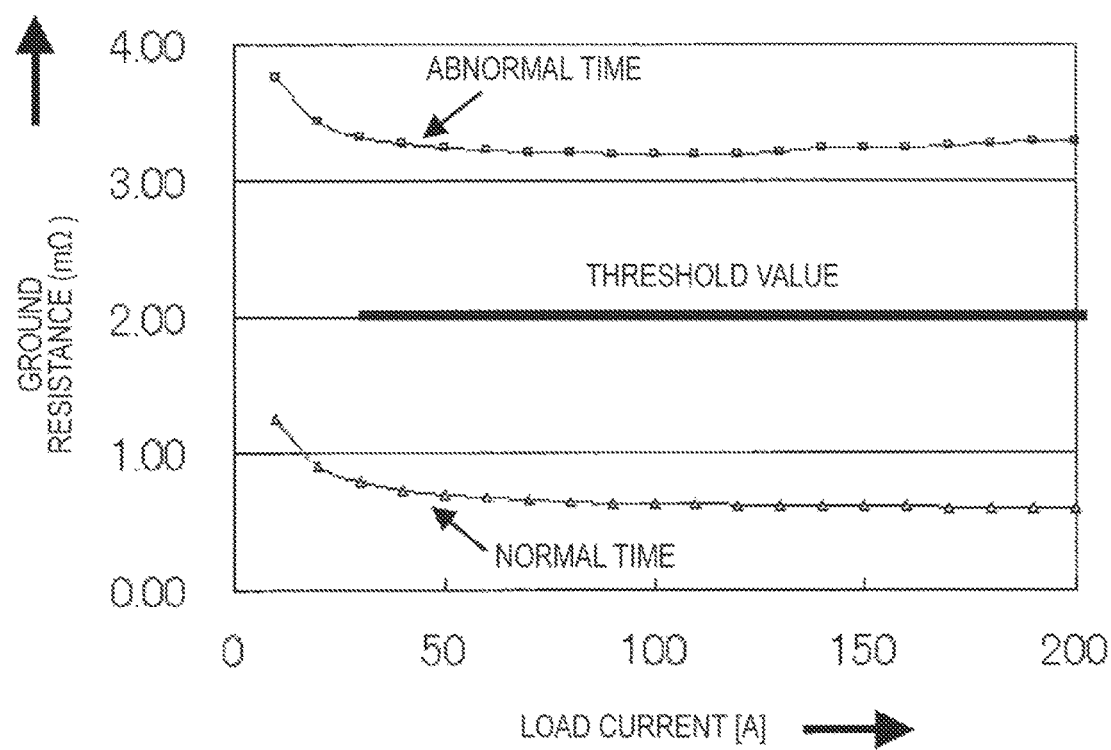
FIG. 9 is a graph illustrating an example of characteristics between resistance value indicating the ground connection and load current.

FIG. 9 is a graph illustrating an example of characteristics between the resistance value indicating the ground connection of the power supply device 1 determined from the actual measurement result shown in FIG. 8 and the load current. In FIG. 9, as in FIG. 8, a graph shown on the upper side in the figure shows characteristics at the time of occurrence of an abnormality, and a graph shown on the lower side shows characteristics at a normal time. In these graphs, the value on the vertical axis indicates the magnitude of the resistance value (mΩ) calculated by the microcomputer 5, and the value on the horizontal axis indicates the magnitude of the load current (A) measured by the current measurement circuit 4.

The connection resistance values of Rc1, Rs, and Rc2 in FIG. 7 are as small values as possible within a range of values that can be taken actually. On the other hand, the connection resistance value Rg of the ground strap cable 6 is as large a value as possible within a range appropriate to the amount of current consumed in the electrical component 10 and the low voltage battery 9. This can reduce the difference between the characteristics at an abnormal time and those at a normal time shown in FIGS. 8 and 9 as low as possible within an expected range. That is, it is appreciated that when the presence or absence of the occurrence of an abnormality can be reliably determined with the set values of the connection resistances shown in FIG. 7, the presence or absence of the occurrence of an abnormality can be determined under any condition.

FIG. 8 shows that the graph at the time of occurrence of an abnormality greater in voltage potential difference than the graph at a normal time, and the voltage potential difference increases in proportion to an increase in the load current in both of the graphs. Therefore, when the presence or absence of an abnormality is determined by determining to which one of the graphs in FIG. 8 the voltage potential difference measured by the voltage measurement circuit 3 corresponds, the magnitude of the threshold value to be set for the voltage potential difference varies depending on the magnitude of the load current.

Consider the case where 2.6 V is set as the threshold value as shown in FIG. 8, for example. In this case, when the load current is in the range of about 30 A to 120 A, it can be correctly determined to which one of the graphs in FIG. 8 the measured voltage potential difference corresponds. However, when the load current is in a range other than this, for example, 200 A, the voltage potential differences exceed a threshold value of 2.6 V in both of the graphs, and thus it cannot be determined to which one or the graphs in FIG. 8 the measured voltage potential difference corresponds. Consequently, it can be determined that the ground connection is abnormal even though it is normal.

Further, consider the case where 2.8 V is set as the threshold value as shown in FIG. 8. In this case, even when the load current is 200 A as described above, it can be correctly determined to which one of the graphs in FIG. 8 the measured voltage potential difference corresponds. However, when the load current is relatively small, for example, 60 A, the voltage potential differences are below 2.8 V in both of the graphs, and thus it cannot be determined to which one of the graphs in FIG. 8 the measured voltage potential difference corresponds. Consequently, it can be determined that the ground connection is normal even though an abnormality occurs therein.

On the other hand, FIG. 9 shows that the graph at the time of occurrence of an abnormality is greater in resistance value than the graph at a normal time, and both of the graphs show approximately constant resistance values irrespective of the magnitude of the load current, except in a range in which the load current is small. Therefore, when the presence or absence of an abnormality is determined by determining to which one of the graphs in FIG. 9 the resistance value calculated by the microcomputer 5 corresponds, the magnitude of the threshold value to be set for the resistance value can be constant irrespective of the magnitude of the load current.

Consider the case where 2 mΩ is set as the threshold value as shown in FIG. 9, for example. In this case, when the load current is either 60 A or 200 A, it can be correctly determined to which one of the graphs in FIG. 9 the calculated resistance value corresponds. Consequently, a misjudgment as explained in FIG. 8 is prevented from occurring, and it can be reliably determined whether the ground connection is normal or not.

In the power supply device 1, in the manner described above, determination on the ground connection is performed using the result of calculation of the resistance value indicating the ground connection of the power supply device 1, instead of the result of measurement of the voltage potential difference between the GND voltage potential and the chassis 8. Thus, the presence or absence of an abnormality in the ground connection can be reliably determined even when the load current is relatively small.

When it is determined that an abnormality occurs in the ground connection of the power supply device 1 from the fact that the resistance value calculated by the microcomputer 5 is greater than or equal to a predetermined threshold value, it is preferable to control the operation of the voltage conversion circuit 2 by the microcomputer 5 limit direct-current power supplied from the power supply device 1. When the ground strap cable 6 is not properly connected, this can prevent load current consumed in the electrical component 10 and the low voltage battery from flowing through other paths such as the shielded wires 12a and 12b. As a result, heat generation or breakage caused by an unexpected large current flowing through the shielded wires 12a and 12b or the like can be avoided.

According to the embodiment described above, the power supply device 1 converts direct-current power inputted from the high voltage battery 11 into direct-current power with a predetermined voltage to supply it to the low voltage battery 9 and the electrical component 10 outside, and is provide with the voltage conversion circuit 2, the voltage measurement circuit 3, the current measurement circuit 4, and the microcomputer 5. The voltage conversion circuit 2 performs voltage conversion of direct-current power inputted from the high voltage battery 11. The voltage measurement circuit 3 measures a voltage value indicating the voltage potential difference between the ground voltage potential inside the power supply device 1 and the ground point of the chassis 8 provided outside of the power supply device 1 and connected via the ground strap cable 6 to the ground voltage potential in the power supply device 1. The current measurement circuit 4 measures the current value of a load current flowing when direct-current power is supplied from the power supply device 1. The microcomputer 5 calculates a resistance value corresponding to the ground connection of the power supply device 1, based on the voltage value measured by the voltage measurement circuit 3 and the current value measured by the current measurement circuit 4. This allows the ground connection of the power supply device 1 mounted on a vehicle to be monitored accurately, based on the calculated resistance value.

Figure 10:
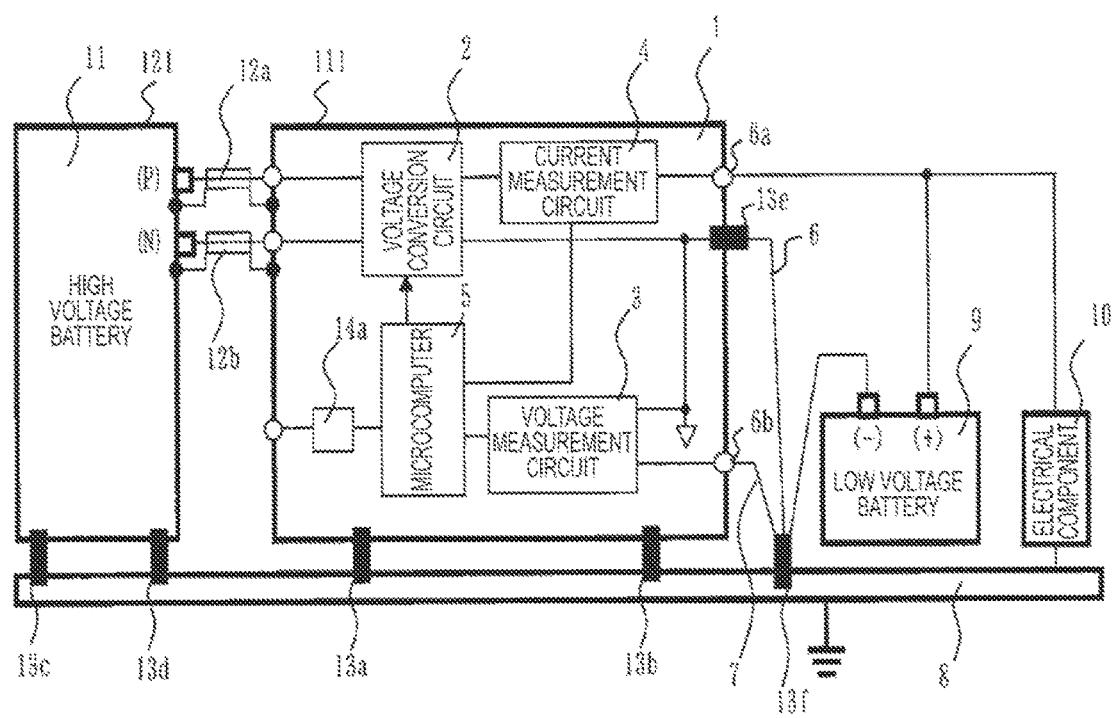
FIG. 10 is a block diagram illustrating the configuration of a power supply system including a modification of the power supply device according to the embodiment of the present invention.

Next, a modification of the power supply device 1 will be described. FIG. 10 is a block diagram illustrating the configuration of a power supply system including a modification of the power supply device 1 according to the embodiment of the present invention. A power supply device 1 shown in FIG. 10 is further provided with a signal output circuit 14a for outputting signals to various devices connected to the outside, in addition to the respective components of the power supply device 1 shown in FIG. 1. When a resistance value calculated by a microcomputer 5 is greater than or equal to a threshold value that indicates the occurrence of an abnormality in the ground connection of the power supply device 1 as described above, by using the signal output circuit 14a, a predetermined signal can be outputted from the power supply device 1 to a vehicle control device, a personal computer, or the like not shown connected to the outside. Therefore, in the event of an abnormality in the ground connection of the power supply device 1 when the vehicle is being driven or receiving a maintenance checkup, notification of that fact can be provided to a driver or an operator.

Figure 11:
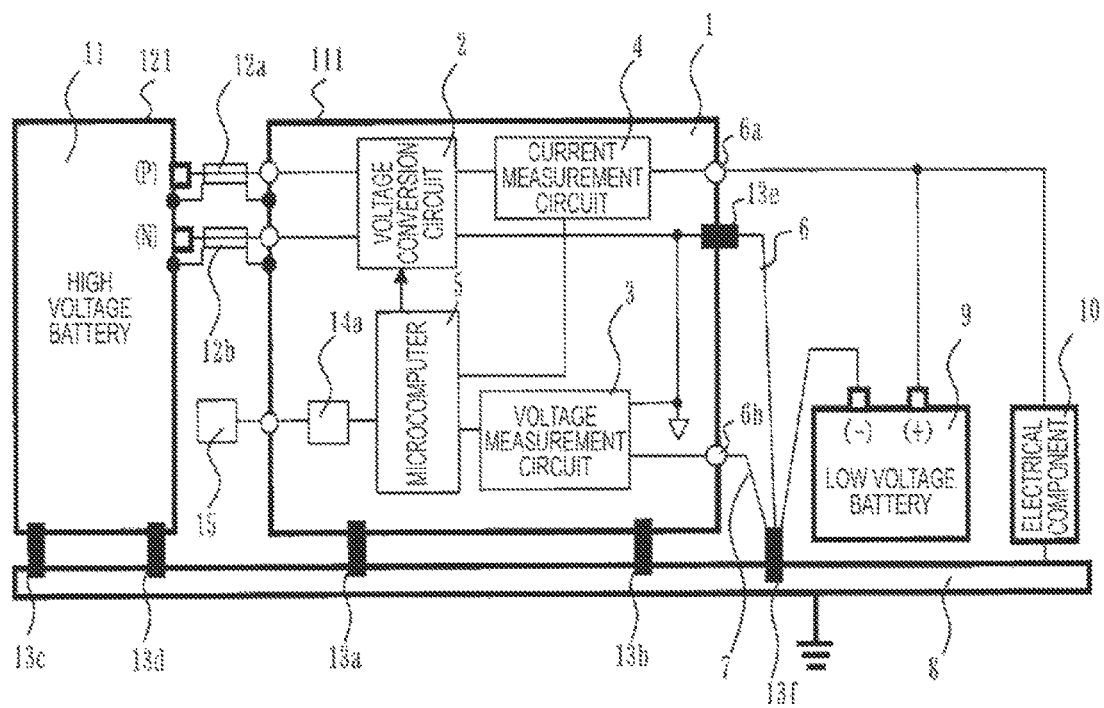
FIG. 11 is a block diagram illustrating the configuration of a power supply system including another modification of the power supply device according to the embodiment of the present invention.

FIG. 11 is a block diagram illustrating the configuration of a power supply system including another modification of the power supply device 1 according to the embodiment of the present invention. A power supply device 1 shown in FIG. 11 is further provided with a display circuit. 15 by an LED lamp or a liquid crystal display, for example, in addition to the respective components of the power supply device 1 shown in FIG. 10. The display circuit 15 is located in the vicinity of a driver's seat or the like in a vehicle. When a signal as described above is outputted from the signal output circuit 14a as the resistance value calculated by a microcomputer 5 is greater than or equal so a threshold value, the display circuit 15 provides a predetermined display in response to the signal output. Thus, in the event of an abnormality in the ground connection of the power supply device 1 when the vehicle is being driven, notification of that fact can be provided to the driver. Therefore, the driver can take a necessary measure such as repair before an accident occurs.

Figure 12:
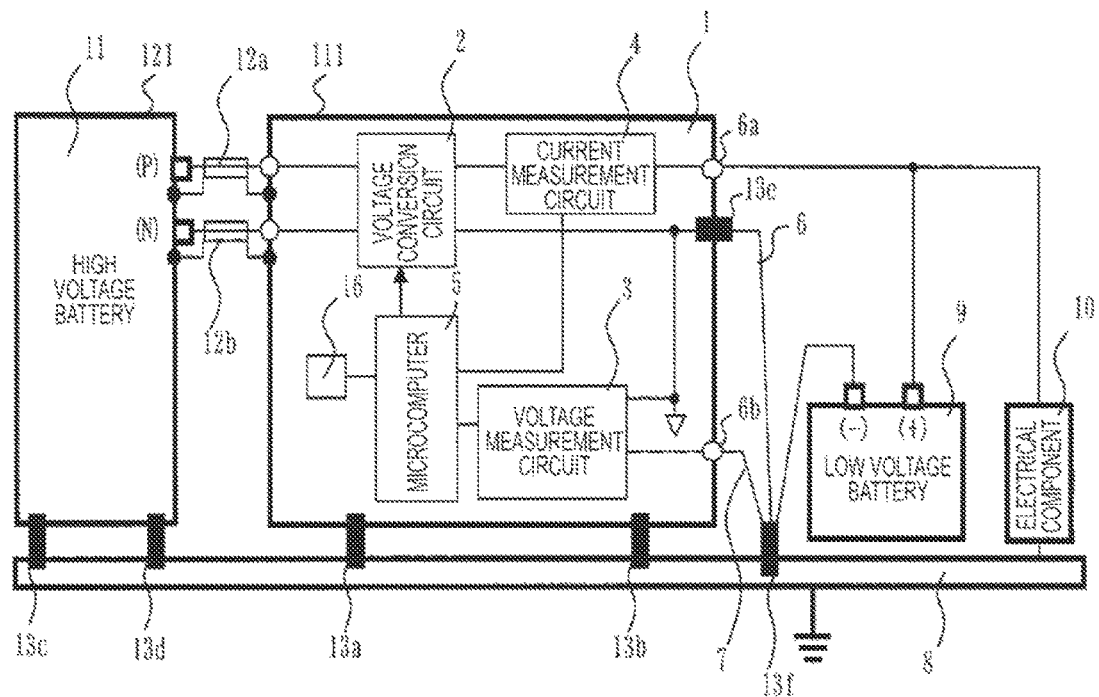
FIG. 12 is a block diagram illustrating the configuration of a power supply system including a different modification of the power supply device according to the embodiment of the present invention.

FIG. 12 is a block diagram illustrating the configuration of a power supply system including a different modification of the power supply device 1 according to the embodiment of the present invention. A power supply device 1 shown in FIG. 12 is further provided with a memory 16 for storing results of calculation of the resistance value by a microcomputer 5, in addition to the respective components of the power supply device 1 shown in FIG. 1. A history of resistance values calculated at regular intervals by the microcomputer 5 is stored in the memory 16 by a predetermined number of times. When the resistance value gradually increases due to aged deterioration or the like, for example, a change in the resistance value thereafter can be inferred from the history stored in the memory 16. Therefore, the possibility of occurrence of an abnormality in the ground connection of the power supply device 1 can be anticipated to take an appropriate measure as needed.

Figure 13:
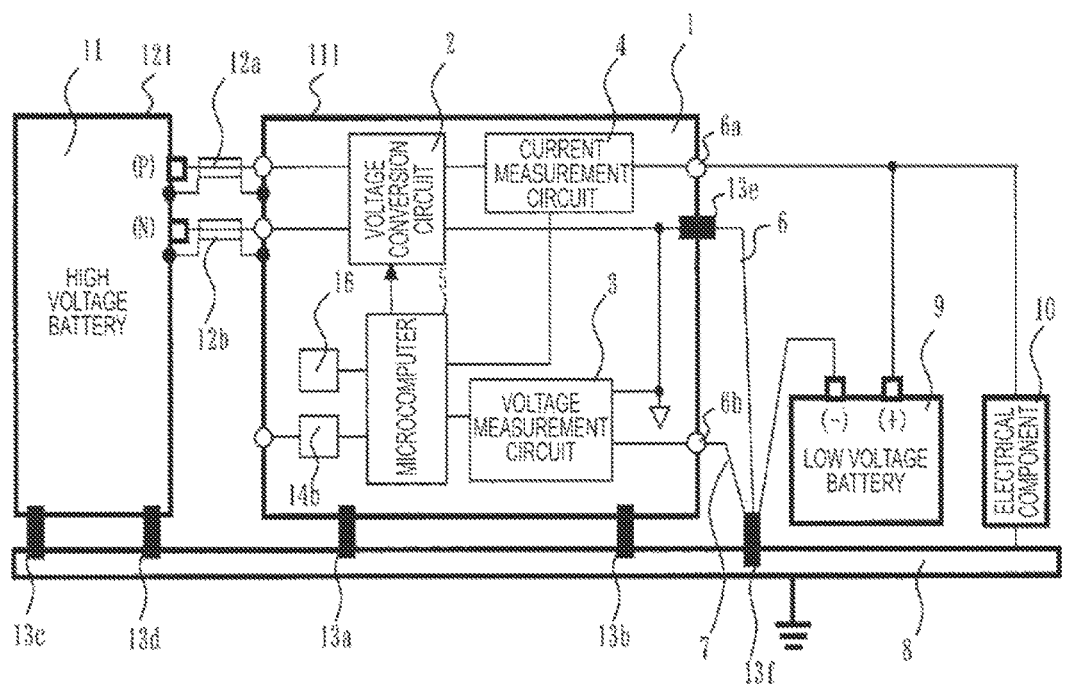
FIG. 13 is block diagram illustrating the configuration of a power supply system including a further modification of the power supply device according to the embodiment of the present invention.

FIG. 13 is a block diagram illustrating the configuration of a power supply system including a further modification of the power supply device 1 according to the embodiment of the present invention. A power supply device 1 shown in FIG. 13 is further provided with an information input-output circuit 14b and a memory 16 in FIG. 12, in addition to the respective components of the power supply device 1 shown in FIG. 1. A history of resistance values stored in the memory 16 is outputted via the information input-output circuit 14b to a vehicle control device, a personal computer, or the like not shown connected to the outside, so as to be able to be useful in determining a cause in the event of an accident. Further, various types of information for use in processing by a microcomputer 5 may be written in the memory 16 from the vehicle control device, the personal computer, or the like via the information input-output circuit 14b. For example, information on a threshold value used for comparison to determine whether the ground connection of the power supply device 1 is abnormal or not as described above is written in the memory 16 from the outside via the information input-output circuit 14b. Based on the information on the threshold value, the microcomputer 5 compares a calculated resistance value with the threshold value to determine the presence or absence of an abnormality in the ground connection of the power supply device 1. This can facilitate data update such as changing the threshold value.

Figure 14:
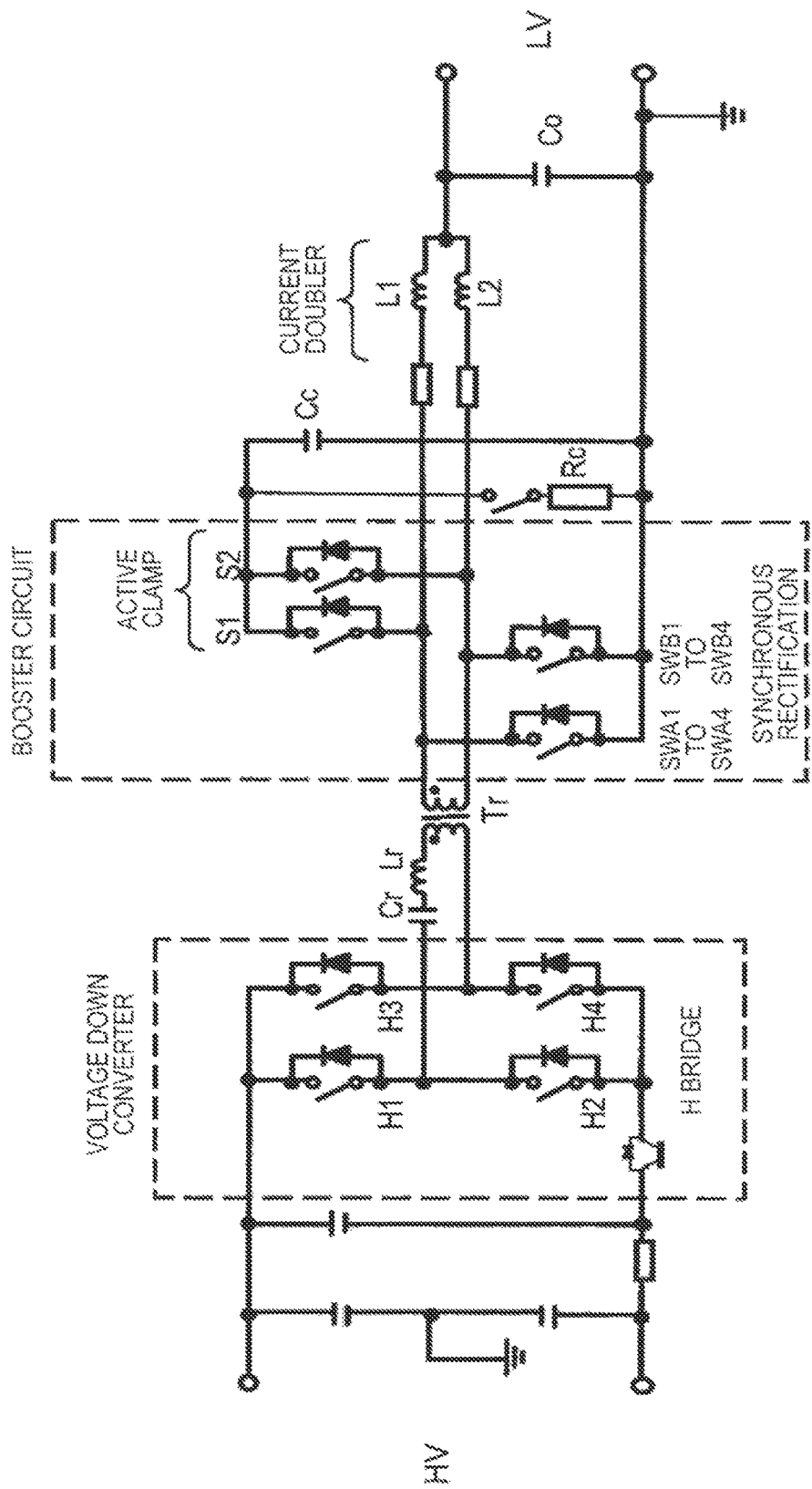
FIG. 14 is a circuit diagram illustrating an example of a voltage conversion circuit in the power supply device according to the present invention.

Here, the voltage conversion circuit 2 will be described in detail. FIG. 14 is a circuit diagram illustrating an example of the voltage conversion circuit 2 inside the power supply device 1 according to the present invention. The voltage conversion circuit 2 is a DC-DC converter capable of bidirectionally converting voltages, and includes a voltage down converter provided on the high-voltage (HV) side and a booster circuit provided on the low-voltage (LV) side. These circuits are configured to perform synchronous rectification instead of diode rectification. In order to provide high output in HV-LV conversion, high-current components are used for switching elements, and smoothing chokes are increased in size.

Specifically, on both of the HV side and the LV side, MOSFETs with recovery diodes are used to configure H bridge-type synchronous rectification switching circuits. In the switching control of these switching circuits, an LC series resonant circuit with a capacitor Cr and an inductor Lr is used to cause zero cross switching at a high switching frequency (100 kHz), thereby increasing the conversion efficiency and reducing heat loss. In addition, an active clamp circuit is provided to reduce losses caused by circulating currents during voltage down operation and to prevent the occurrence of surge voltage at the time of switching so as to reduce the breakdown voltage of the switching elements, thereby lowering the breakdown voltage of the circuit components. These realize a reduction in size of the device.

Further, in order to ensure high output on the LV side, a current doubler system of a full-wave rectification type is used. For higher output, a plurality of switching elements is operated simultaneously in parallel to ensure high output. In an example in FIG. 14, four elements are arranged in parallel like SWA1 to SWA4 and SWB1 to SWB4. Further, these switching circuits and smoothing reactors L1 and L2 of a small size are in a two-circuit parallel arrangement to have symmetry for higher output. This two-circuit arrangement of small reactors allows the entire DC-DC converter device to be reduced in size as compared with the disposition of one large reactor.

Figure 15:
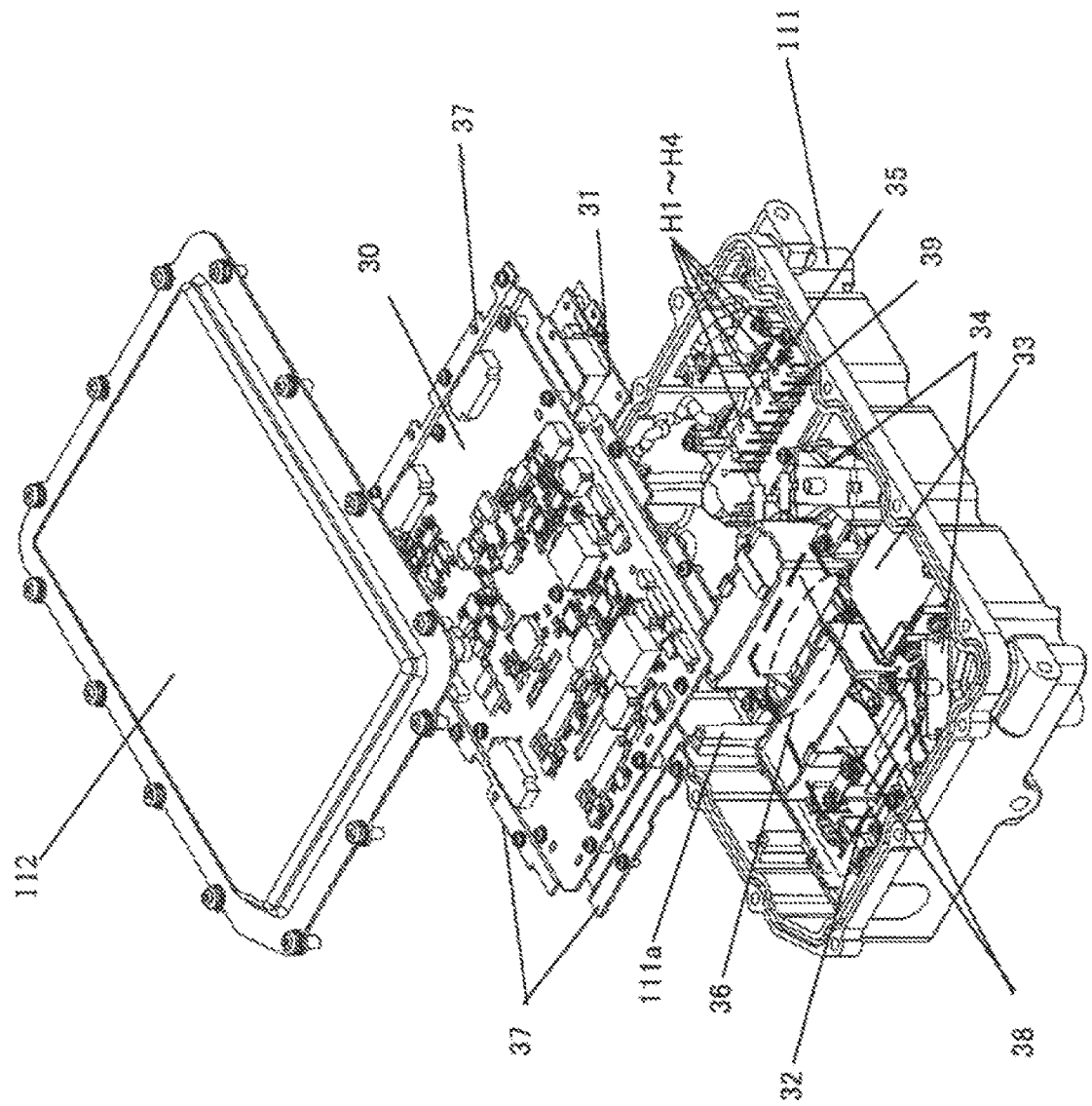
FIG. 15 is an exploded perspective view illustrating an example of the arrangement of components of the voltage conversion circuit in the power supply device according to the present invention.

FIG. 15 is an exploded perspective view illustrating an example of the arrangement of components of the voltage conversion circuit 2 inside the power supply device 1 according to the present invention. As shown in FIG. 15, the components of the voltage conversion circuit 2 are housed in the metal (for example, aluminum die-cast) case 111. A case cover 112 is bolted to an opening of the case 111. On the bottom portion inside the case 111, a power semiconductor module 35 on which a main transformer 33, inductor elements 34, and switching elements H1 to H4 are mounted, a booster circuit substrate 32 on which switching elements 36 are mounted, capacitors 38, and the like are placed. Main heat-generating components among these respective components are the main transformer 33, the inductor elements 34, the power semiconductor module 35, and the switching elements 36.

Describing the correspondence between the components shown in FIG. 15 and the circuit diagram in FIG. 14, the main transformer 33 in FIG. 15 corresponds to a transformer Tr in FIG. 14, the inductor elements 34 correspond to the current-doubler reactors L1 and L2, and the switching elements 36 correspond to the switching elements SWA1 to SWA4 and SWB1 to SWB4. On the booster circuit substrate 32, the switching elements S1 and S2 in FIG.14 or the like are also mounted.

Terminals 39 of the switching elements H1 to H4 are extended upward of the case 111 and connected to a voltage down converter substrate 31 that is disposed above the power semiconductor module 35. The voltage down converter substrate 31 is fixed on a plurality of support members protruded upward from the bottom of the case 111. In the power semiconductor module 35, the switching elements H1 to H4 are mounted on a metal substrate formed with a pattern, and the back side of the metal substrate is fixed to the bottom of the case 111 to come into close contact therewith. The booster circuit substrate 32 on which the switching elements 36 are mounted is made of a similar metal substrate. In FIG. 15, since the booster circuit substrate 32 is hidden behind the capacitors 38 and the like, the position is shown by a broken line.

On a control circuit substrate 30, a control circuit that controls the switching elements provided in the booster circuit and the voltage down converter is mounted. The control circuit substrate 30 is fixed on a metal base plate 37. The base plate 37 is fixed to a plurality of support portions ilia protruded upward from the bottom portion of the case 111. As a result, the control circuit substrate 30 is disposed via the base plate 37 above the heat-generating components (such as the main transformer 33, the inductor elements 34, and the power semiconductor module 35) disposed on the case bottom portion.

As described above, according to the embodiment, even when a large current does not flow, an abnormality in the ground connection of the power supply device 1 can be detected. Further, in the event of an abnormality, output of the voltage conversion circuit 2 can be limited to avoid heat generation and breakage. Moreover, a user can be notified of the occurrence of an abnormality to take a necessary measure before an accident occurs. In addition, in the event of an accident, it can be useful in determining a cause. Furthermore, it becomes possible to anticipate the possibility of occurrence of an abnormality.

Although the embodiment of the present invention has been described in detail above, the present invention is not limited to the above-described embodiment, and can be altered as appropriate within the scope of the technical idea. For example, the power supply device 1 has been described as a power supply device mounted on a vehicle such as an electric vehicle or a hybrid vehicle in the above embodiment, it may be a power supply device used in other uses. For example, it may be a power supply device mounted on a vehicle of another kind such as an ordinary vehicle or an electric train, or may be a power supply device mounted on something other than a vehicle.

The above-described embodiment and various modifications are only examples. The present invention is not limited to their contents unless the characteristics of the invention are not impaired.

In the above description, an embodiment and various modifications have been described, but the present invention is not limited to their contents. Other aspects conceivable within the scope of the technical idea of the present invention are also included in the scope of the present invention.

The disclosure of the following priority basic application is herein incorporated as a cited reference.

Japanese Patent Application No. 2011-239190 (filed on Oct. 31, 2011).

The invention claimed is:

1. A power supply device that converts an inputted high-voltage direct-current power to a low-voltage direct-current power with a predetermined voltage to supply the low-voltage direct-current power to the outside, the device comprising:
   a voltage conversion circuit that converts the voltage of the inputted high-voltage direct-current power to the low-voltage direct-current power;
   a voltage measurement circuit that measures a voltage value indicating a voltage potential difference between a ground voltage potential on a conductive case of the power supply device and a ground point provided outside the power supply device and connected to the conductive case via a ground strap cable;
   a current measurement circuit that measures a current value of a load current flowing when the low-voltage direct-current power is supplied from the power supply device; and
   an arithmetic circuit that calculates a resistance value corresponding to ground connection of the power supply device, based on the voltage value measured by the voltage measurement circuit and the current value measured by the current measurement circuit.

2. The power supply device according to claim 1, wherein the low-voltage direct-current power supplied to the outside is limited when the resistance value calculated by the arithmetic circuit is greater than or equal to a predetermined threshold value.

3. The power supply device according to claim 1, further comprising a signal output circuit that outputs a predetermined signal to the outside when the resistance value calculated by the arithmetic circuit is greater than or equal to a predetermined threshold value.

4. The power supply device according to claim 3, further comprising a display circuit that provides a predetermined display in response to the signal outputted from the signal output circuit.

5. The power supply device according to claim 1, further comprising a memory that stores the resistance value calculated by the arithmetic circuit.

6. The power supply device according to claim 5, further comprising an information output circuit that outputs information on the resistance value stored in the memory to the outside.

7. The power supply device according to claim 1, further comprising:

an information input circuit that receives from the outside information on a threshold value with which to compare the resistance value calculated by the arithmetic circuit; and a memory that stores the threshold value information received by the information input circuit.

8. The power supply device according to claim 7, wherein the resistance value calculated by the arithmetic circuit is compared with the threshold value stored in the memory.

9. The power supply device according to claim 1, wherein the voltage measurement circuit has an input line connected to the ground point, the input line being connected to a predetermined power source voltage via a resistance.

10. The power supply device according to claim 1, wherein one end of the ground strap cable is connected to the conductive case by a first metal bolt and another end of the ground strap cable is connected to a vehicle chassis by a second metal bolt.

\* \* \* \* \*